May 1, 1962  O. M. GILLIATT ETAL  3,032,085
NUT CRACKING MACHINE
Filed March 11, 1960  4 Sheets-Sheet 1

Oliver M. Gilliatt
Hubert K. Gilliatt
John T. Gilliatt
INVENTORS

BY Clarence A. O'Brien
and Harvey B. Jacobson
Attorneys

May 1, 1962   O. M. GILLIATT ETAL   3,032,085
NUT CRACKING MACHINE
Filed March 11, 1960   4 Sheets-Sheet 3

Oliver M. Gilliatt
Hubert K. Gilliatt
John T. Gilliatt
INVENTORS

BY Clarence A. O'Brien
and Harvey B. Jacobson
Attorneys

May 1, 1962   O. M. GILLIATT ETAL   3,032,085
NUT CRACKING MACHINE
Filed March 11, 1960   4 Sheets-Sheet 4

Oliver M. Gilliatt
Hubert K. Gilliatt
John T. Gilliatt
INVENTORS

United States Patent Office 3,032,085
Patented May 1, 1962

3,032,085
NUT CRACKING MACHINE
Oliver M. Gilliatt and Hubert K. Gilliatt, Box 132, and John T. Gilliatt, R.R. 1, all of Bedford, Ind.
Filed Mar. 11, 1960, Ser. No. 14,365
20 Claims. (Cl. 146—8)

This invention relates to machines for extracting nut meats by cracking the shells of nuts therefrom.

An object of the invention is to provide a high output nut shell cracking machine which is capable of functioning in a manner which cracks and removes nut shells from nuts with little or no damage to the nut meats.

Although the machine in accordance with the invention may be used for cracking different kinds of nuts, the machine is especially adaptable for pecans. At the present time commercially available and used equipment is capable of cracking the nut shells on pecans. By this is meant Western pecans wherein the meat of the nut is not packed very tight in the shells. As far as can be determined there is no known equipment of a machine type capable of handling Bradley pecans, and these are not commercially cracked by machines. Bradley nuts are distinguishable from Western nuts in that the Bradley nuts are quite small and the meat is packed very full in the shell. These nuts are generally known to have a better flavor and to be superior to Western nuts in all categories of quality classification. Yet, the full potential of Bradley nuts cannot be realized because of the high expense of cracking.

Accordingly, a further object of the invention is to provide a machine capable of cracking nuts without damage to the nut meats or with a very high and satisfactory percentage of unbroken nut meats.

Another object of the invention is to provide a machine capable of extracting the meats from Bradley nuts or other nuts which are characterized by the fullness of the nut meat in the shell, and with a very high percentage of whole meats.

Briefly, the invention is embodied in a machine which has a suitable frame capable of supporting the various structural subassemblies. A hammer is used as the means for cracking the shells of the nuts as the nuts are conveyed on a special type of conveyor which automatically orients the nuts as they are conveyed. A typical conveyor that will serve this purpose is a roller conveyor where the rollers are spaced to form an upwardly opening crotch within which the nuts are disposed and rolled by the rolling action of the rollers.

As a nut on the conveyor approaches the cracking station, the nut to be cracked functions as a gauge, elevating the hammer to the size of the nut. This automatically sets the hammer for variations in sizes of nuts, it being well known that the nuts are not exactly uniform as to size and shape.

When the hammer is elevated using the nut as a gauge, a hydraulic buffer is automatically set in response to the size of the nut. A lost motion connection between the hammer and the hydraulic buffer will enable the hammer to be moved during its actuation movement, and the buffer will stop the descent of the hammer when it has moved a predetermined distance that is, the distance which is desired for a particular stroke, and this is governed by the size of the nut in the cracking station.

A very important feature of the invention is the hydraulic buffer. It includes, among other structures, a hydraulic circuit controlled by a valve. During the adjusting procedure of the hydraulic buffer the valve is open enabling a comparatively free flow of liquid to be trapped in the system by the valve when the valve closes. The closing of the valve is timed with the cracking operation on the nut, i.e., the hammer actuation.

A further object of the invention is to provide a machine preferably constructed essentially in the manner described above or at least, with one or more of the features mentioned therein to achieve the objective of a better, faster operating and considerably more productive machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
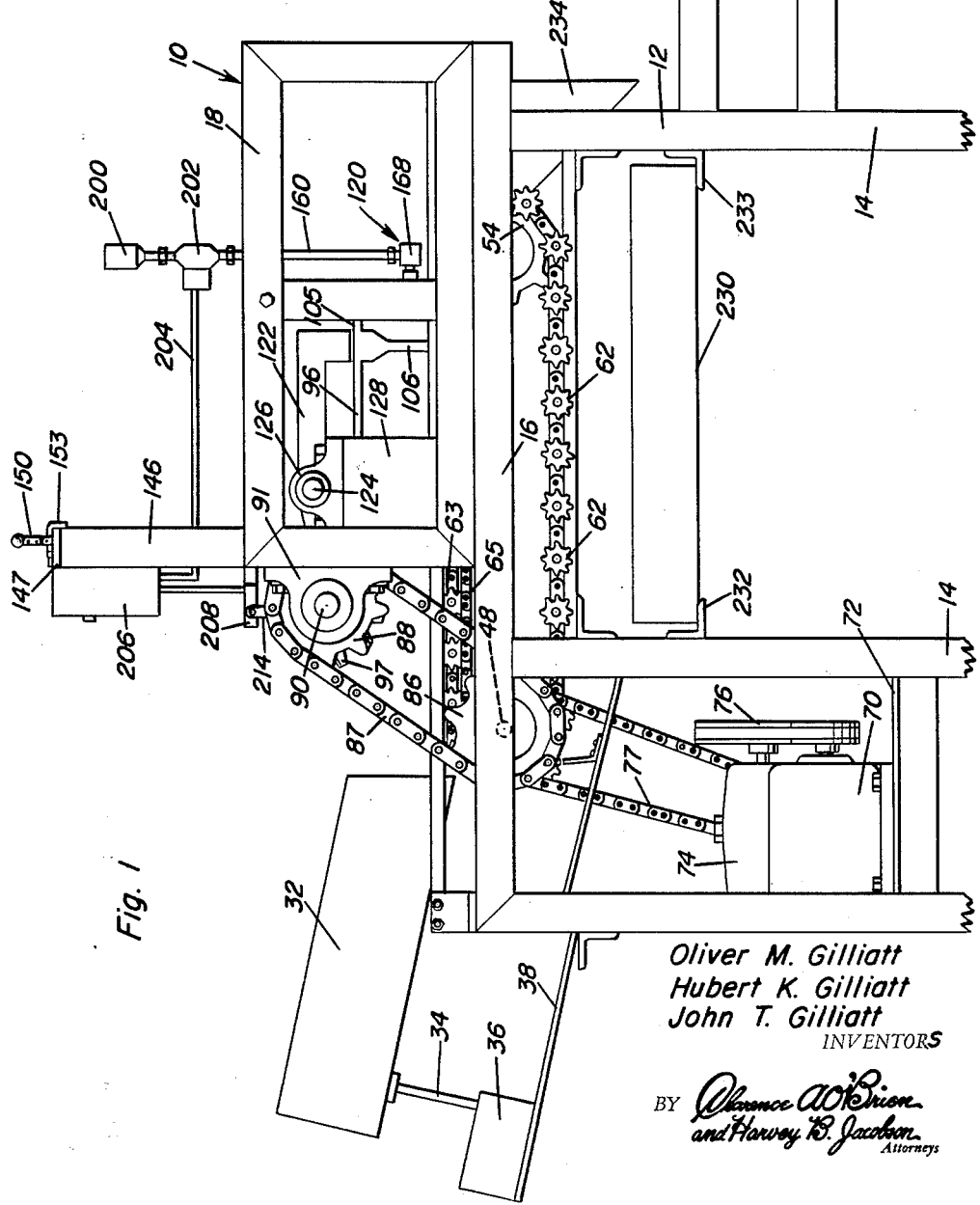
FIGURE 1 is a side view of a machine constructed in accordance with the invention.

In the accompanying drawings, machine 10 is illustrated to exemplify the principles of the invention. The machine is composed of a frame 12. The frame is made as a matter of convenience, i.e., constructed in such a way that it conveniently and properly supports the various subassemblies of the machine. Consequently, the frame 12 includes a number of legs 14 and a rectangular subframe 16 attached to the upper ends of the legs. Another subframe 18 made of frame members connected to form a rectangular support, is attached to subframe 16 and rises from the top surface thereof. A number of transverse and longitudinal braces are attached between the various parts of the frame for strength of construction and convenience.

Figure 2:
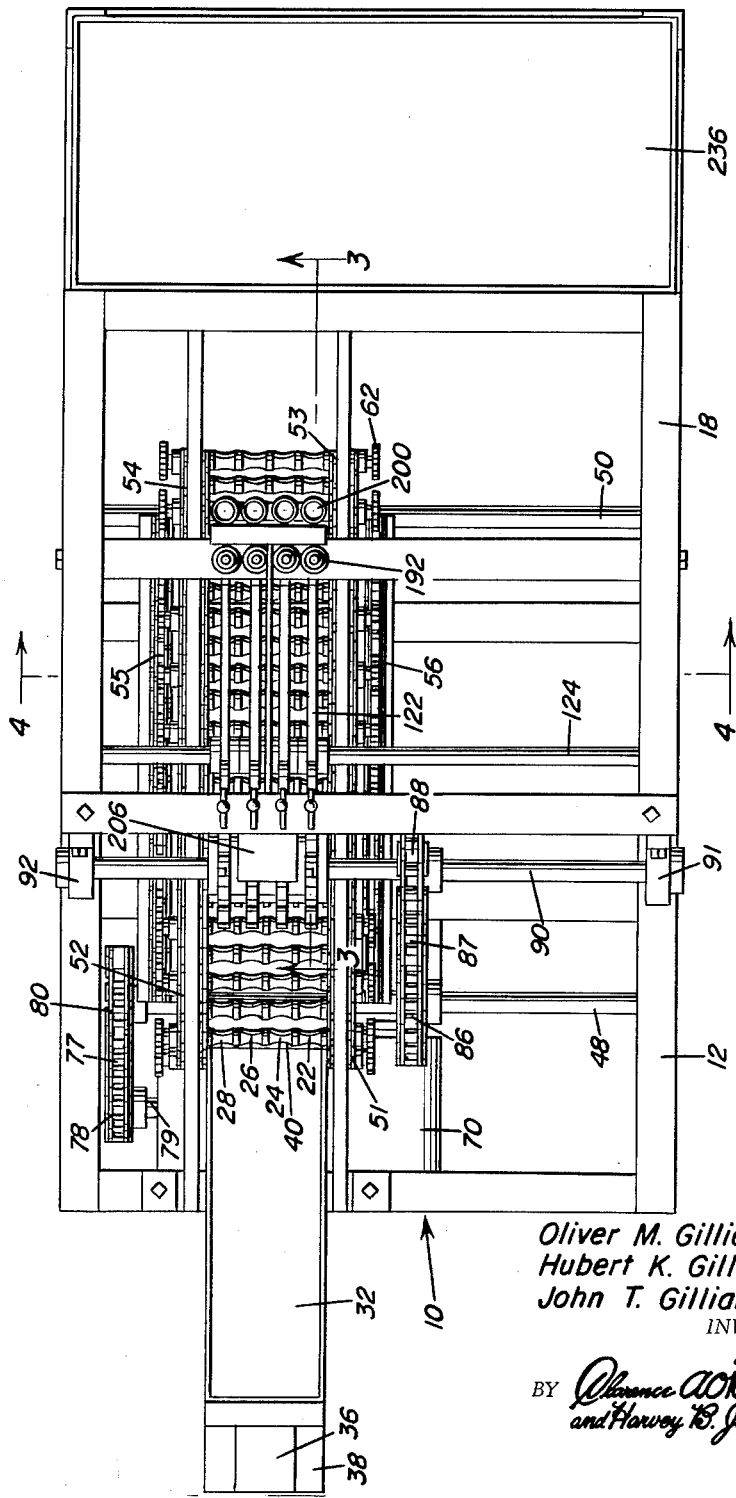
FIGURE 2 is a top view of the machine in FIGURE 1.

The illustrated machine has four separate channels (FIGURE 2) 22, 24, 26 and 28, and it is to be clearly understood that the number of channels may be increased or decreased. With four separate channels, there are four separate and individual devices for cracking nuts which travel along each channel. If the number of channels is decreased, the cracking assemblies pertinent thereto will be correspondingly decreased, and if the number were increased, there would be a corresponding increase in nut cracking assemblies. Since the arrangement for each channel is identical, one channel is described in detail. Therefore typical channel 22 includes an endless conveyor 30 on which nuts are fed and propelled. The feeding may be achieved in a number of ways, one of which is to have a feeding trough 32 supported by shaft 34 that extends from a commercially available vibrator 36. The vibrator is attached to frame 12 by means of bracket 38, and the trough 32 is inclined downwardly toward the inlet end 40 of endless conveyor 30 (FIGURE 2).

The endless conveyor is a roller conveyor, made of a plurality of transverse rollers 42, each of which has a reduced center portion. Adjacent rollers, for instance rollers 42 and 43 (FIGURE 3) cooperate in their spacing to form an upwardly opening crotch or pocket 44 in which a single nut is disposed during the movement of the conveyor.

Figure 4:
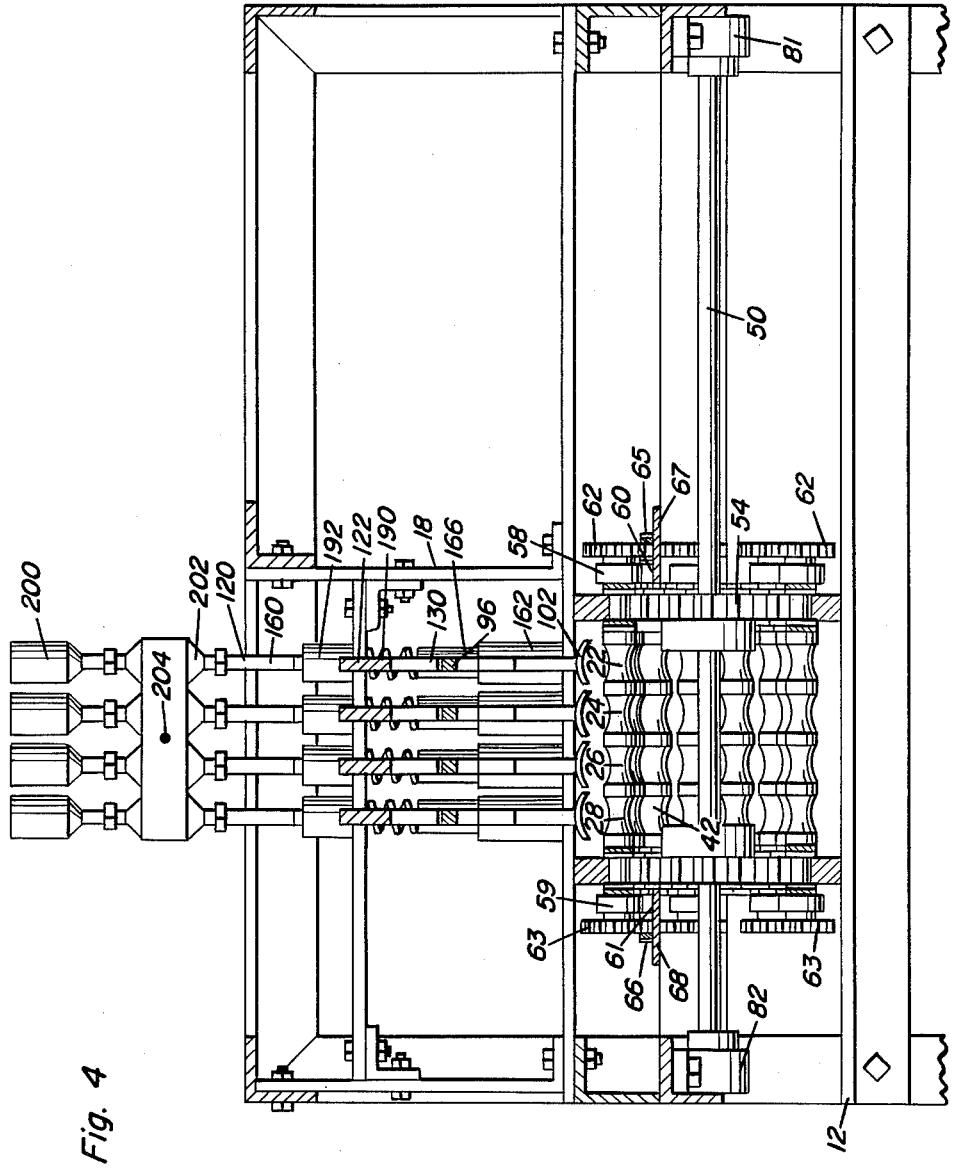
FIGURE 4 is a sectional view taken approximately on the line 4—4 of FIGURE 2.

There are two shafts 48 and 50 at the ends of the conveyor 22, and sprockets 51 and 52 are spaced apart and attached to shaft 48, while sprockets 53 and 54 are spaced apart and attached to shaft 50. Conventional roller chains 55 and 56 are entrained over the pairs of sprockets, i.e., chain 56 is engaged with sprockets 51 and 53, and chain 55 is engaged with sprockets 52 and 54. Rollers 42, 43 and all other rollers of the conveyor constitute the spindles of the two chains, and the spindles are extended sufficiently far beyond the links of the chains to enable pairs of rollers or small wheels 58 and 59 to be mounted on the spindles that are formed by rollers 42 and 43. Wheels 58 and 59 are typical of all wheels of the endless conveyor, and they are disposed on stationary rails 60 and 61 (FIGURE 4) attached to the frame 12. This is to provide a firm support for the upper flight of the endless conveyor. In addition, there are pairs of gears 62 and 63 at the outer extremities of each of the rollers, for example roller 42, and the purpose of these gears is to engage a pair of rack gears or a pair of roller chains 65 and 66 which function as a rack gear assembly. The chains 65 and 66 are attached to the frame, for instance the supports 67 and 68 for the rails 60 and 61, and these chains are for the upper flight of the conveyor only. As the endless conveyor is propelled, the gears 63 and 62 engaging the stationary chains 66 and 65 keep the rollers 42, 43 rotating.

The endless conveyor must be propelled in its path of motion. Therefore electric motor 70 supported on a shelf 72 attached to frame 12, is used. The motor preferably drives one end of shaft 48 by way of a gear or hydraulic reducer 74 and a drive connection, for instance a belt and pulley transmission 76, between the motor and reducer. Chain 77 is engaged with a sprocket 78 on the output shaft 79 of the gear reducer (FIGURE 2) and is engaged with a sprocket 80 attached to shaft 48 intermediate the ends thereof. The extremities of shaft 48 and the extremities of shaft 50 are journaled in suitable bearings, for instance bearings 81 and 82 for shaft 50 (FIGURE 4) and identical bearings (not shown) for shaft 48. The bearings are attached to subframe 16 of frame 12.

Figure 3:
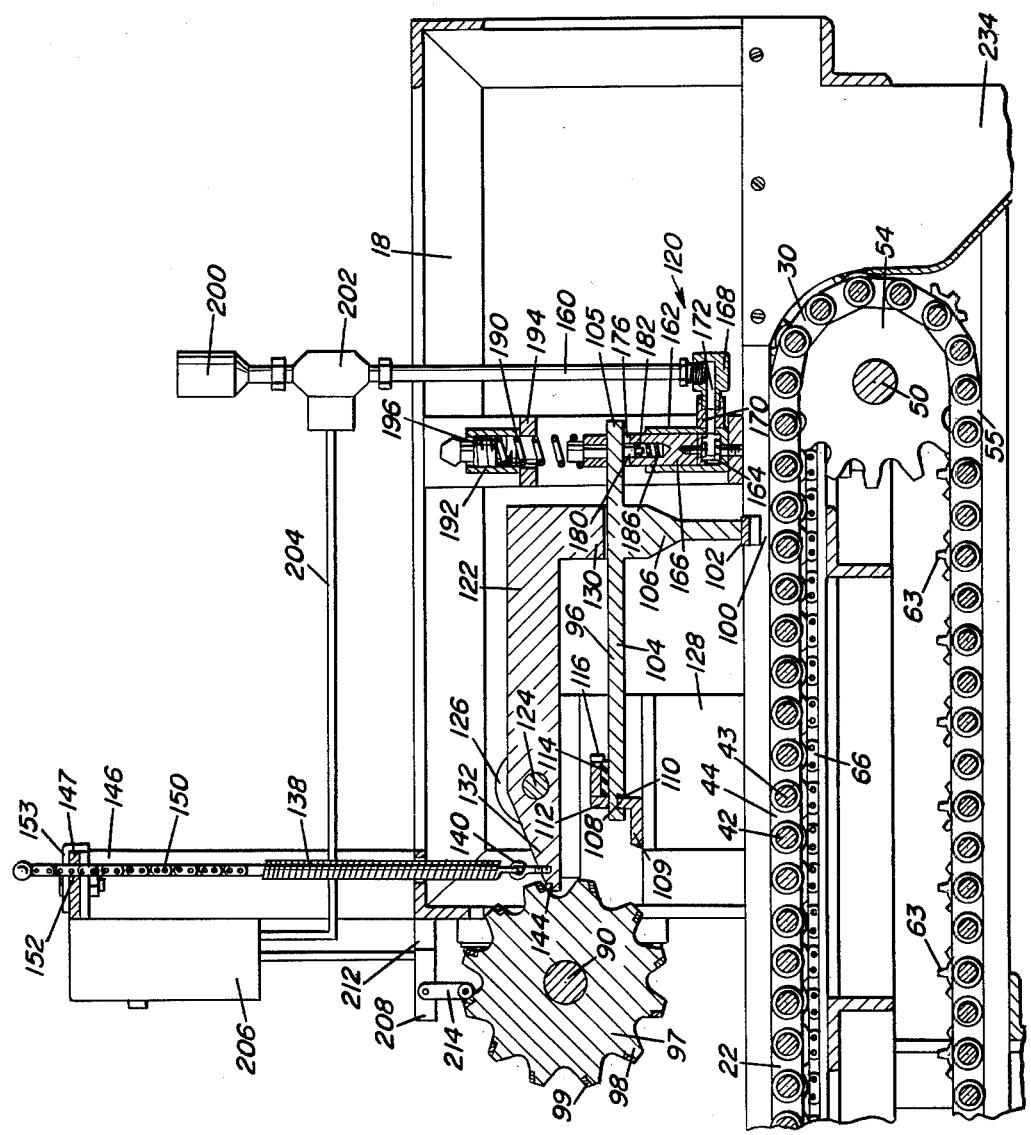
FIGURE 3 is a sectional view taken approximately on the line 3—3 of FIGURE 2 and on an enlarged scale.

Another sprocket 86 is fixed to shaft 48, and there is a chain 87 engaged therewith. This chain is also entrained around a sprocket 88 which is secured to shaft 90 supported by bearings 91 and 92 that are attached to one end of subframe 18. Consequently shaft 90 rotates at the same time that the endless conveyor is operative. This shaft 90 has a portion of a means for operating the nut shell cracking hammer 96 (FIGURE 3). The portion referred to is a toothed wheel or cam 97 with a large number of teeth or lobes 98 projecting from the periphery thereof. Hardened wear plates 99 are recessed in the front face of the teeth to enable the machine to achieve high speeds without rapid wear of the toothed wheel or cam.

The nut shell cracking station 100 is defined as the space between a pocket 44 and foot 102 at the lower end of hammer 96. The foot is a transversely curved plate which straddles the top part of the nut in the cracking station. Hammer 96 is constructed in the form of a flat straight arm 104 having another arm 106 fixed thereto intermediate the ends and projecting laterally therefrom. Foot 102 is at the lower end of arm 106. One end of arm 104 has a notch 110 on its lower surface that constitutes a portion of the means for movably, preferably pivotally, mounting hammer 96 on frame 12. A transverse brace 109 constituting a part of subframe 18 is the portion of frame 12 on which the hammer is mounted, and brace 109 is an angle member with an upstanding flange 112 having a rectangular aperture 108 therethrough. Notch 110 forms a saddle when seated upon the bottom edge of aperture 108 when the end of arm 104 is passed through the aperture in the upstanding flange 112. A rubber bumper 114 is secured to the lower surface of a downwardly opening holder 116, and the holder is fixed to an upper edge of flange 112. The bumper holds notch 110 in engagement with the lower edge of aperture 108 and yields when the hammer is lifted, however the hammer is free to move downwardly, except for a restraining force exerted by a hydraulic buffer or stop 120 which will be described in detail subsequently. A slight amount of clearance is preferably provided between the notched portion of arm 96 and the edges of aperture 108.

A hammer operating member 122 is freely mounted for pivotal movement on a transverse spindle 124 or is secured to spindle 124 which is mounted for rotation at its ends in bearings 126 carried by pillow blocks 128. These, in turn, are secured to the framing of the machine at the level of subframe 16. Member 122 has a head 130 located immediately above arm 106 of hammer 96. It also has an end portion 132 projecting to the side of the axis of oscillatory movement of the member 122 opposite to that side on which head 130 is located.

A spring 138 is secured by a coupling 140 to portion 132 of the hammer operating member 122. There is an inset wear plate 144 in the extremity of portion 132, and this is engaged by the wear plates 99 of teeth 98 upon rotation of the cam 97. As the member 124 is oscillated in this way, spring 138 stretches because the upper end thereof is adjustably secured to a support 146 which rises above and which is attached to subframe 18. Consequently, spring 138 is stretched by the action of the teeth 98 moving over portion 132, and after a given tooth passes over wear plate 144, the spring 138 will propel the head 130 end of member 122 downwardly with a snap action so that the head strikes hammer 96. The method of adjustably securing the upper end of spring 138 to support 146 is quite arbitrary. A screw can be used or a construction as shown in FIGURE 3 may be adopted. Here a chain 150 is secured to the upper end of spring 138, and the chain passes through a hole 152 in the upper transverse part 147 of support 146. A pin 153 is passed through rollers of roller chain 150 in order to hold the chain supported, it being evident from inspection of FIGURE 3 that the pin 153 seats on the upper surface of member 147.

Returning now to the previously mentioned hydraulic buffer, the construction is quite simple as shown in FIGURE 3. There is a hydraulic circuit composed of a tube 160 connected to the lower end of a cylinder 162. The cylinder defines a cavity 164, and there is a member 166 movably mounted therein and functioning as a movable wall. The member in the illustration is a free floating piston, however, this may be substituted by a diaphragm. A coupling 168 is secured to the lower end of tube 160, and connects with an inlet tube 170 at the lower extremity of cylinder 162. Passageway 172 is in registry with the lower end of cylinder 162 and with the interior of tube 160 to establish communication between the tube 160 and the cavity 164. The tube constitutes a standpipe which is filled with liquid, preferably water, at all times.

The upper part of piston 166 extends vertically upward through the open upper end of cylinder 162, and it has a slot 176 extending transversely therethrough. The end 105 of arm 104 is passed loosely through slot 176 thereby establishing a lost motion connection between the hammer 96 and the piston 166. The clearance of slot 176 is specifically pointed out as being important. A small pusher 180 in the form of a rod, is mounted in an axial bore 182 in piston 166, and there is a light spring 186 in bore 182 and bearing against the pusher 180. The pusher bears against the lower surface of the portion 105 of hammer arm 104 and lightly holds the portion 105 of the hammer against the upper surface of slot 176.

Piston 166 is urged downwardly by the spring compression of spring 190 which has the upper end disposed in a spring retainer cylinder 192 attached to a brace 194 that constitutes a part of the subframe 18. The function of spring 190 is to keep a light force on the piston 166, preventing it from tending to move completely out of the cylinder 162. Plug 196 is threaded in retainer 194 and forms an adjustable abutment for the upper end of the spring, while the lower end of spring 190 seats directly on the upper end of piston 166.

Reservoir 200 is secured to the upper end of the tube 160 and may be a cup in which approximately six ounces of water is maintained. Water must be drawn from and returned to the reservoir during the adjustment of the hydraulic buffer. There are control means for the hydraulic buffer, these control means include a normally open valve 202 interposed between tube 160 and reservoir 200. The normally open valve is electrically operated, and such valves are ordinarily commercially available in a solenoid operated form. Electrical conductors in a conduit 204 are operatively connected with the solenoid valve 202, and they extend to a control box 206 carried by support 146. A source of electrical potential is used as a portion of an electric circuit to energize the valve 202 thereby causing it to close. The circuitry is rudimentary and therefore it is not shown in detail. However, the circuit has a switch 208 interposed therein and carried by a bracket 212 attached to subframe 18 adjacent to wheel 97. Switch 208 has a switch operator, for instance an arm 214 attached thereto and in the path of travel of teeth 98. Consequently, the switch 208 is actuated in timed relationship with the actuation of member 122. Further, the switch 208 may be a time delay switch of the adjustable type so that precise timing may be obtained by adjustment of the switch. As an alternative, an electrical or mechanical time delay may be interposed in the electrical circuit to achieve the timing adjustment.

The function and operation of the conveyor has already been discussed. Further, the function and operation of the hammer 96 has been described. The electrical circuit operation is quite evident from inspection of FIGURE 3. As the wheel 97 rotates, switch arm 214 is actuated thereby closing the electrical circuit which includes the solenoid valve 202.

The closing of this valve takes place during the downstroke or slightly before the downstroke of hammer 96 which is the nut cracking stroke.

The hydraulic buffer functions as follows: as a nut in a cradle 44 between a pair of rollers 42 and 43 is moved to the right as viewed in FIGURE 3, an upper curved surface of the nut contacts the left lower edge of foot 102 and cams it upwardly as the nut moves to the right thereby elevating hammer 96 and the part 105 of the hammer. This causes piston 166 to be elevated and will allow liquid to flow from the reservoir 200, down the standpipe represented by tube 160 and into the cavity 164. The piston 166 is obviously elevated a distance proportional to the size of the nut since it is the surface of the nut which actually cams the piston upwardly.

While this is taking place wheel 97 is rotating causing the hammer operating member 122 to be elevated at the head end 130 thereof. At the top of the stroke of the member 122 or slightly before the top of the stroke is reached and as the nut begins to pass under foot 102, switch 208 is actuated by wheel 97 causing the valve 202 to be closed, and this closes the hydraulic circuit by preventing additional water from flowing from reservoir 200 into the standpipe and more important, by preventing water from being returned from the standpipe into the reservoir.

At an instant thereafter the portion 132 of member 122 is released from the tooth which drives it, and spring 138 forcibly operates member 122 causing it to strike the hammer 96 and propel the hammer downward, causing the foot 102 to crack the nutshell of the nut.

The downward motion of hammer 96 is restrained by the hydraulic buffer or stop in that the part 105 of the hammer can travel downwardly only the distance permitted by the lost motion connection established by part 105 and slot 176. Thereafter the part 105 contacts the piston 166 of the hydraulic buffer, and this arrests further downward movement of the hammer so as to prevent the meats of the nuts from being broken while permitting the shells to be cracked.

The nutshells are broken by hammer 102 into sufficiently small pieces to drop between rollers 42 and 43 and fall downwardly through the spaces between rollers of the endless conveyor and into a pan 230 supported on brackets 232 and 233. These brackets are secured to legs 14 and retain the pan beneath the endless conveyor. The nut meats are retained on the conveyor, and are discharged from one end of the conveyor down a chute 234 attached to frame 12 and onto a table 236 which diagrammatically represents any type of receptacle, device or mechanism for subsequent handling of the nut meats. Since the hydraulic piston 166 stops the downwardly movement of the hammer 102 a predetermined distance above the rollers 42, 43 proportional to the diameter of the nut to be cracked, the meats of the nuts are not broken during the downward movement of the hammer. Also, since the shells of the nuts are brittle and their meats are relatively flexible, this further insures that the shells are broken into many small pieces by the hammer while the meats are able to absorb considerable shock without breaking. The unbroken meats are larger than the spaces between rollers 42, 43 and therefore can not drop through these spaces. The meats are thereby carried on top of the rollers 42, 43 to chute 234.

It has been pointed out previously that only one channel 22 is described in detail. All other channels are identical and function simultaneously with the described channel. For instance, shaft 90 is equipped with one cam or toothed wheel 97 for each channel, and there is a hydraulic buffer, hammer, operating member, etc. for each of the channels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a machine for cracking nuts, a frame, a nut conveyor carried by said frame, a hammer, means mounting said hammer on said frame for movement toward said conveyor, hydraulic buffer means connected with said hammer, said hammer having a nut engaging foot near said conveyor and adapted to be elevated by the nut to be cracked as the nut is propelled with and on the conveyor, thereby elevating said hammer, said buffer having a liquid circuit provided with a valve, control means connected with said valve and retaining said valve open when said hammer is being elevated to adjust the liquid circuit to the position of said hammer, mechanical means for driving said hammer to crack the shell of the nut, said control means operatively connected with said mechanical means to activate said control means to the valve closed position when said hammer is driven.

2. The machine of claim 1, wherein said buffer includes a cylinder, a piston in said cylinder, a lost motion mechanical connecting means attaching said hammer with said piston, a tube connected with said cylinder, said valve connected with said tube, said cylinder and tube forming said hydraulic circuit.

3. The machine of claim 1, wherein said buffer includes a cylinder, a piston in said cylinder, a lost motion mechanical connecting means attaching said hammer with said piston, a tube connected with said cylinder, said valve connected with said tube, said cylinder and tube forming said hydraulic circuit, said tube forming a standpipe, and a reservoir connected with said tube.

4. In a machine for cracking nuts, a frame, a nut conveyor carried by said frame, a hammer, means mounting said hammer on said frame for movement toward said conveyor, hydraulic buffer means connected with said hammer, said hammer having a nut engaging foot near said conveyor and adapted to be elevated by the nut to be cracked as the nut is propelled with and on the conveyor, thereby elevating said hammer, said buffer having a liquid circuit provided with a valve, control means connected with said valve and retaining said valve open when said hammer is being elevated to adjust the liquid circuit to the position of said hammer, mechanical means for driving said hammer to crack the shell of the nut, said control means operatively connected with said mechanical means to activate said control means to the valve closed position when said hammer is driven, said mechanical means including a toothed wheel, said control means including a switch actuated by the teeth of said wheel, and conductive means extending from said switch to said valve to operate said valve to the closed position.

5. A nut cracking and shelling machine comprising a frame provided with a plurality of nut conveying and cracking assemblies, each assembly having a roller conveyor for simultaneously orienting and conveying nuts, a hammer having a nut engaging foot opposing said conveyor, means movably mounting said hammer on said frame, a hydraulic buffer including a liquid circuit having a valve adapted to open and close to open and close said circuit, means mechanically connecting said buffer to said hammer, said valve being in the open position when a nut on the conveyor is contacted by said foot so that said buffer is hydraulically adjusted in accordance with the size of the nut, means connected with said valve for actuating said valve to close said hydraulic circuit, and means carried by said frame for actuating said hammer while said hydraulic circuit is closed.

6. A nut cracking and shelling machine comprising a frame provided with a plurality of nut conveying and cracking assemblies, each assembly having a roller conveyor for simultaneously orienting and conveying nuts, a hammer having a nut engaging foot opposing said conveyor, means movably mounting said hammer on said frame, a hydraulic buffer including a liquid circuit having a valve adapted to open and close to open and close said circuit, means mechanically connecting said buffer to said hammer, said valve being in the open position when a nut on the conveyor is contacted by said foot so that said buffer is hydraulically adjusted in accordance with the size of the nut, means connected with said valve for actuating said valve to close said hydraulic circuit, means carried by said frame for actuating said hammer while said hydraulic circuit is closed, said hammer actuating means including a striker pivoted to said frame, a toothed wheel rotatably carried by said frame, and said striker engaged by the teeth of said wheel.

7. A nut cracking and shelling machine comprising a frame provided with a plurality of nut conveying and cracking assemblies, each assembly having a roller conveyor for simultaneously orienting and conveying nuts, a hammer having a nut engaging foot opposing said conveyor, means movably mounting said hammer on said frame, a hydraulic buffer including a liquid circuit having a valve adapted to open and close to open and close said circuit, means mechanically connecting said buffer to said hammer, said valve being in the open position when a nut on the conveyor is contacted by said foot so that said buffer is hydraulically adjusted in accordance with the size of the nut, means connected with said valve for actuating said valve to close said hydraulic circuit, means carried by said frame for actuating said hammer while said hydraulic circuit is closed, said hammer actuating means including a striker pivoted to said frame, a toothed wheel rotatably carried by said frame, said striker engaged by the teeth of said wheel, said valve actuating means including a switch having a switch operator engaged by said teeth, and conductive means attached to said switch and said valve.

8. A machine to crack nuts, said machine comprising a frame, a hammer, means pivotally connecting said hammer to said frame, a conveyor to move the nuts one by one to a position opposing said hammer in which position each nut functions as a gauge moving said hammer to a position corresponding to the size of the nut, a hydrostatic buffer carried by said frame, means connecting said hammer with said buffer to adjust said buffer in accordance with the movement of said hammer caused by the nut.

9. A machine to crack nuts, said machine comprising a frame, a hammer, means pivotally connecting said hammer to said frame, a conveyor to move the nuts one by one to a position opposing said hammer in which position each nut functions as a gauge moving said hammer to a position corresponding to the size of the nut, a hydrostatic buffer carried by said frame, means connecting said hammer with said buffer to adjust said buffer in accordance with the movement of said hammer caused by the nut, control means connected with said buffer for locking said hydrostatic buffer in the adjusted position.

10. A machine to crack nuts, said machine comprising a frame, a hammer, means pivotally connecting said hammer to said frame, a conveyor to move the nuts one by one to a position opposing said hammer in which position each nut functions as a gauge moving said hammer to a position corresponding to the size of the nut, a hydrostatic buffer carried by said frame, means connecting said hammer with said buffer to adjust said buffer in accordance with the movement of said hammer caused by the nut, control means connected with said buffer for locking said hydrostatic buffer in the adjusted position, and hammer actuating means operatively connected with the hammer to actuate said hammer in timed relation with the actuation of said control means.

11. The machine of claim 10, wherein said hydrostatic buffer includes a chamber having a movable wall forming member, and said means connecting said hammer with said buffer include a lost motion connection structure.

12. The machine of claim 10, wherein said hydrostatic buffer includes a chamber having a movable wall forming member therein, and a standpipe connected with said chamber.

13. The machine of claim 10, wherein said hydrostatic buffer includes a chamber having a movable wall forming member therein, a standpipe connected with said chamber, said control means include an electrically operative valve connected with said standpipe, and a switch controlled electric circuit having said electrically operative valve therein.

14. The subject matter of claim 13, wherein said switch is a time delay switch.

15. A machine to crack nuts, said machine comprising a frame, a hammer, hammer operating means, means pivotally connecting said hammer to said frame, a conveyor to move the nuts one by one to a position opposing said hammer in which position each nut functions as a gauge moving said hammer to a position corresponding to the size of the nut, a hydrostatic buffer carried by said frame, means connecting said hammer with said buffer to adjust said buffer in accordance with the movement of said hammer caused by the nut, control means connected with said buffer for locking it in the adjusted position, a cam, means mounting said cam on said frame for rotation, means connected with said cam for rotating it, a portion of said hammer operating means contacting said cam so as to actuate said hammer when said cam is rotated, and said control means operatively connected with said cam to have said control means operate in timed relationship with the actuation of said hammer.

16. A machine to crack nuts, said machine comprising a frame, a hammer, hammer operating means, means pivotally connecting said hammer to said frame, a conveyor to move the nuts one by one to a position opposing said hammer in which position each nut functions as a gauge moving said hammer to a position corresponding to the size of the nut, a hydrostatic buffer carried by said frame, means connecting said hammer with said buffer to adjust said buffer in accordance with the movement of said hammer caused by the nut, control means connected with said buffer for locking it in the adjusted position, a cam, means mounting said cam on said frame for rotation, means connected with said cam for rotating it, a portion of said hammer operating means contacting said cam so as to actuate said hammer when said cam is rotated, and said control means operatively connected with said cam to have said control means operate in timed relationship with the actuation of said hammer, said control means including an electrically operative valve, a switch provided with a switch operator contacting said cam, an electric circuit controlled by said switch and having electrical conductive means attached to said switch and to said valve.

17. The machine of claim 16, wherein said switch is a time delay switch.

18. A machine to crack nuts, said machine comprising a frame, a hammer, means pivotally connecting said hammer to said frame, a conveyor to move the nuts one by one to a position opposing said hammer in which position each nut functions as a gauge moving said hammer to a position corresponding to the size of the nut, a hydrostatic buffer carried by said frame, means connecting said hammer with said buffer to adjust said buffer in accordance with the movement of said hammer caused by the nut, control means connected with said buffer for locking said hydrostatic buffer in the adjusted position, and hammer actuating means operatively connected with the hammer to actuate said hammer in timed relation with the actuation of said control means, said conveyor being a roller conveyor having a plurality of laterally spaced rollers, means for rotating said spaced rollers to orient the nuts as they are propelled between said rollers.

19. The machine of claim 18, wherein said rollers constitute an anvil for the cracking of the nuts, and said hammer has a nut engaging foot.

20. A machine to crack nuts, said machine comprising a frame, a hammer, means pivotally connecting said hammer to said frame, a conveyor to move the nuts one by one to a position opposing said hammer in which position each nut functions as a gauge moving said hammer to a position corresponding to the size of the nut, a hydrostatic buffer carried by said frame, means connecting said hammer with said buffer to adjust said buffer in accordance with the movement of said hammer caused by the nut, control means connected with said buffer for locking it in the adjusted position, hammer actuating means operatively connected with the hammer to actuate said hammer in timed relation with the actuation of said control means, and said hammer actuating means including a spring secured thereto and to said frame to move said hammer in a nut striking direction.

No references cited.